United States Patent Office 2,778,110
Patented Jan. 22, 1957

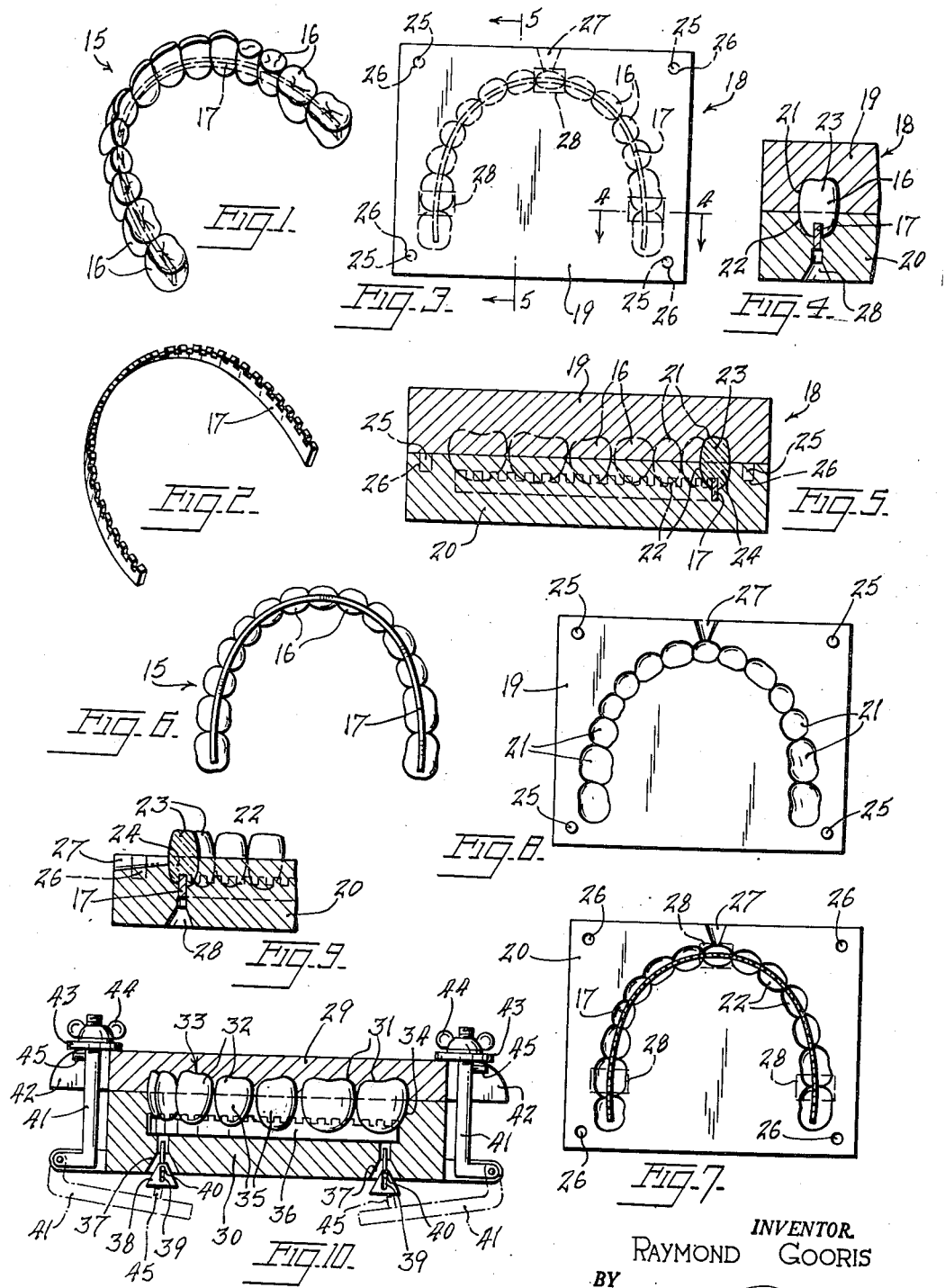

2,778,110
COMPLETE SET OF TEETH AND METHOD OF MAKING

Raymond Gooris, Brooklyn, N. Y.

Application June 29, 1953, Serial No. 364,556

2 Claims. (Cl. 32—2)

This invention relates to new and useful improvements in blocks of false teeth for use by dentists and technicians in making sets of false teeth and to the methods of making such blocks.

More particularly, the present invention proposes the construction of an improved block of false teeth wherein fourteen tooth blocks are made in one block with a stainless metal rail or bar connecting and holding them in plate forming relation.

Still further, the present invention proposes constructing a number of such blocks of teeth manufactured according to existing scale tables which indicate standard variations of length, width and height of the human jaw and face so that a dentist or technician can select from the tables the connected tooth blocks suitable for his particular patient's jaw.

As a further object, the present invention proposes an improved method of manufacturing false teeth for use by dentists and technicians so that the present multiple motions necessary by them in handling the false teeth, where individual unconnected false teeth are supplied, can be reduced substantially.

The present invention further proposes an improved method of manufacturing false teeth so that false teeth can be supplied to dentists, dental surgeons and dental technicians in properly arranged and aligned relation for making plates so that the present twenty-eight motions now required by them to build a complete set of false teeth where individual unconnected teeth are supplied will be obviated to their convenience and efficiency and reduced to two operations.

Another object of the present invention proposes an improved pair of molds for the easy and convenient molding of the improved block of teeth.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a perspective view of a single block containing all the teeth necessary to make a plate of false teeth, the teeth being held together in proper relationship by a stainless metal rail or bar in accordance with the present invention.

Fig. 2 is a perspective view of the stainless metal bar shown in Fig. 1.

Fig. 3 is a top plan view of a mold to form the article shown in Fig. 1.

Fig. 4 is a section taken on line 4—4 of Fig. 3.

Fig. 5 is a section taken on line 5—5 of Fig. 3.

Fig. 6 is a top plan view of the article shown in Fig. 1.

Fig. 7 is a top plan view of the bottom mold half, shown in Figs. 3, 4, and 5.

Fig. 8 is a bottom plan view of the upper mold half, shown in Figs. 3, 4, and 5.

Fig. 9 is a fragmentary sectional view of the bottom mold half with the teeth molded and the top mold half removed.

Fig. 10 is a sectional view of a modification of a mold showing the outside view of the false teeth.

Referring more particularly to the drawings, Figs. 1 and 6 show a block 15 of false teeth 16 for use in making plates or sets of false teeth. The teeth or tooth blocks 16 are arranged in proper plate forming relation and a stainless metal bar or rail 17 is secured to and extends along the roots of the teeth 16 holding the teeth in their proper plate forming relation. The bar or rail 17 is embedded in each tooth 16. By having the teeth 16 so arranged and connected, a dentist or technician may handle all the teeth 16 as a unit in making a plate.

When various different blocks 15 are manufactured according to existing scale tables which indicate standard variations of length, width and height of the human jaw and face, a dentist or technician can select from these tables the teeth blocks suitable for his particular patient's jaw.

According to the method of the present invention, the fourteen teeth or teeth blocks 16 are aligned in proper set or plate forming relation and bar or rail 17 is embedded in the teeth blocks to hold them in such relation to each other in the one block 15 so they can be manipulated without dislocation or breakage.

To do this, a mold 18 is used. The mold 18 shown in Figs. 3 to 5, inclusive, has an upper mold section 19 and a lower mold half or section 20. The mold halves have mold cavities 21 and 22 respectively. Mold cavities 21 are arranged to mold the upper parts or caps 23 of fourteen teeth or teeth blocks 16 and the mold cavities 22 are arranged to mold the lower parts or roots 24 of these teeth or tooth blocks. Alignment pins 25 and recesses 26 are provided in the mold halves 19 and 20 respectively and each mold cavity is arranged in proper set forming relation and the cavities are interconnected. A sprue opening 27 is provided in the mold halves leading to the mold cavities.

The single stainless metal rail or bar 17 is laid in the cavities 22 in the lower mold 20. The mold halves 19 and 20 are then closed together and the tooth molding material forming the teeth 16 is injected or poured into the mold cavities through the sprue opening so that the rail or bar 17 will be embedded in the root or base of each tooth block. The upper mold half 19 is then removed. A plurality of knock-out pin openings 28 are provided at spaced intervals in the lower mold half 19 beneath the metal rail or bar 17 to aid in the removal of the molded block or set of blocks 15 from the lower mold half 19.

This molding process can be repeated with other molds having different tooth block or tooth forming cavities in accordance with existing scale tables. These tables indicate standard variations of length, width and height of the human jaw and face so that a dentist can select a set of teeth blocks 15 suitable for his particular patient's jaw.

The modification of the present invention illustrated in Fig. 10 is characterized by the provision of an upper mold half 29 and a lower mold half 30. The upper mold half 29 has mold cavities 31 arranged to form the caps 32 of a set or block of teeth 33 and the lower mold half 30 has mold cavities 34 arranged to form the root portions or bases 35 of the set or block of teeth 33. The lower mold half cavities 34 are also adapted to receive a stainless metal bar 36 so that the bar will be partially embedded in the root of each tooth when the block of teeth 33 are molded. The lower mold half 30 has knock-out pin openings 37 leading to the bottom of the bar 36 with knock-out pins 38 slidably held therein by slot openings 39 in the pins 38 and by cross pins 40 in the mold half 30.

Pivotally secured to the lower mold half 30 at each side thereof are mold locking members 41 and the upper mold half 29 is provided with recess openings 42 to receive the upper threaded ends of the members 41. Washers 43 and wing nuts 44 provide locking means for holding the members 41 in mold locking position. Each of the members 41 are also provided with an anvil or hammer block 45 disposed so that when the members 41 are rotated as indicated in the dotted outline in Fig. 10, these striking blocks 45 will hit the knock-out pins 38 and loosen or remove the molded teeth from the lower half of the mold.

While I have illustrated and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:

1. The method of manufacturing a complete block of teeth for use in making sets of false teeth which consists in forming a mold with upper and lower cavities for the various teeth in a plate of false teeth, and with a passage communicating with the lower cavities, said cavities being arranged to mold teeth in proper plate forming relation, placing a thin arcurate-shaped stainless bar in the passage with one long edge projecting into the lower cavities and injecting tooth forming material in the cavities, and removing the teeth so formed and the embedded bar connecting the individual teeth.

2. As an article of manufacture, a block of artificial teeth for a false teeth plate for use in making sets of false teeth, comprising a plurality of molded teeth arranged in proper plate forming relation, and a separate stainless steel bar secured to and extending along the bottom of the teeth for the entire length of the teeth holding said teeth rigidly in their proper plate forming relation, said stainless steel bar being embedded in each tooth, said bar being arcuate-shaped in simulation of the shape of the teeth in the mouth and having notches along one edge thereof.

References Cited in the file of this patent

UNITED STATES PATENTS

| | | |
|---|---|---|
| 1,282,210 | Fromm | Oct. 22, 1918 |
| 1,370,192 | Crate | Mar. 1, 1921 |
| 1,696,422 | Thayer | Dec. 25, 1928 |
| 2,428,094 | Raymond | Sept. 30, 1947 |
| 2,576,206 | Barth | Nov. 27, 1951 |
| 2,579,960 | Pita et al. | Dec. 25, 1951 |
| 2,608,760 | Zahn | Sept. 2, 1952 |
| 2,618,062 | Hendricks | Nov. 18, 1952 |
| 2,640,265 | Vaillancourt | June 2, 1953 |
| 2,654,949 | Whiteley et al. | Oct. 13, 1953 |

FOREIGN PATENTS

| | | |
|---|---|---|
| 1,044,241 | France | June 17, 1953 |